(12) United States Patent
Thistleton et al.

(10) Patent No.: US 6,499,376 B2
(45) Date of Patent: Dec. 31, 2002

(54) PEDAL BOX FOR VEHICLE ETC

(75) Inventors: John Stuart Thistleton, Southrey (GB); Colin Anthony Barnes, Scunthorpe (GB); Christopher Andrew Jagger, Wakefield (GB)

(73) Assignee: BCK Technology Limited, Scunthorpe (GB)

( * ) Notice: Subject to any disclaimer, the term of this patent is extended or adjusted under 35 U.S.C. 154(b) by 0 days.

(21) Appl. No.: 09/742,662

(22) Filed: Dec. 21, 2000

(65) Prior Publication Data

US 2001/0025543 A1 Oct. 4, 2001

(30) Foreign Application Priority Data

Dec. 24, 1999 (GB) .............................................. 9930601

(51) Int. Cl.⁷ .......................... G05G 1/14; B60K 28/14
(52) U.S. Cl. ......................................... 74/512; 180/274
(58) Field of Search ............................ 180/274; 74/512, 74/513, 560

(56) References Cited

U.S. PATENT DOCUMENTS

| | | | |
|---|---|---|---|
| 5,848,558 A | * 12/1998 | Isono et al. | 180/274 |
| 5,848,662 A | * 12/1998 | Sakaue | 180/274 |
| 6,089,342 A | * 7/2000 | Muller et al. | 180/274 |
| 6,101,894 A | * 8/2000 | Tiemann et al. | 74/512 |
| 6,112,616 A | * 9/2000 | Schonlau et al. | 180/274 |
| 6,176,340 B1 | * 1/2001 | Mizuma et al. | 180/274 |
| 6,178,846 B1 | * 1/2001 | Specht et al. | 180/274 |
| 6,209,416 B1 | * 4/2001 | Tiemann et al. | 74/512 |
| 6,276,228 B1 | * 8/2001 | Hoerster | 74/512 |
| 6,286,388 B1 | * 9/2001 | Brewer | 74/512 |
| 6,305,239 B1 | * 10/2001 | Johansson et al. | 180/334 |

* cited by examiner

*Primary Examiner*—David A. Bucci
*Assistant Examiner*—Julie K. Smith
(74) *Attorney, Agent, or Firm*—Trexler, Bushnell, Giangiori, Blackstone & Marr, Ltd.

(57) ABSTRACT

A pedal box for a vehicle (V), comprises a pedal (E) pivotally mounted intermediate its end on a pedal pin (PP) carried by the pedal box, so as to have, beyond each side of the pedal pivot (PP), a lower pedal part carrying a footpad (FP), and an upper pedal part; an abutment surface (S) provided in or on the upper pedal part and so located with respect to the pedal pivot axis (PP) that the abutment surface (S) is beyond a top dead center position of the pedal pivot (PP) at the driver/passenger compartment (PC) side; and an activation device (C, D) adapted, in use, to be secured between a portion (Q) of the vehicle (V) designed to deform upon frontal impact, and a portion (P) of the vehicle (V) designed for minimal deformation upon frontal impact and, upon activation, to engage the abutment surface (S) such that the upper pedal part is rotated towards the driver/passenger compartment (PC), and the lower pedal part is rotated away from the driver/passenger compartment (PC).

8 Claims, 2 Drawing Sheets

PEDAL BOX FOR VEHICLE ETC

FIELD OF THE INVENTION

This invention relates to a pedal box for a vehicle, being a unit which houses and/or supports, for pivotal movement, both a clutch and a brake pedal, but clearly may house or support only a brake pedal in respect of a vehicle with an automatic gearbox, and to a vehicle provided with such a pedal box.

BACKGROUND OF THE INVENTION

With improvements in other aspects of passive safety in passenger vehicles, the desire to minimize secondary injuries to both passengers and drivers in the event of an accident, has increased, and presence of at least a brake pedal, and usually a clutch pedal, both with foot pads frequently leads to lower limb injuries in a frontal crash situation of sufficient magnitude.

OBJECT OF THE INVENTION

A basic object of the invention is to provide a pedal box for a vehicle in which, in the event of a frontal impact accident, lower limb injuries to drivers caused by foot operated pedals is reduced or eliminated.

SUMMARY OF A FIRST ASPECT OF THE INVENTION

According to a first aspect of the invention, there is provided a pedal box for a vehicle, the pedal box comprising:

(i) a pedal pivotally mounted intermediate its ends on a pedal pin carried by the pedal box, so as to have, beyond each side of the pedal pivot, a lower pedal part carrying a footpad, and an upper pedal part;

(ii) an abutment surface provided in or on the upper pedal part and so located with respect to the pedal pivot axis that the abutment surface is beyond a top dead centre position of the pedal pivot at the driver/passenger compartment side; and (iii) an activation device adapted, in use, to be secured between a portion of the vehicle designed to deform upon frontal impact, and a portion of the vehicle designed for minimal deformation upon frontal impact and, upon activation, to engage the abutment surface such that the upper pedal part is rotated towards the driver/passenger compartment, and the lower pedal part is rotated away from the driver/passenger compartment.

PREFERRED OR OPTIONAL FEATURES OF THE FIRST ASPECT

The abutment surface is constituted by the bottom of a "V" or "U"-shaped groove or slot. If constituted by a slot, the latter is preferably arcuate.

In one embodiment, the activation device is constituted by a first component of a two component activation device being normally biassed to an inactive position and adapted, in use, to be secured to a portion of the vehicle designed for minimal deformation upon frontal impact, and comprising first and second linearly spaced-apart pins, the first pin, in the inactive position of the activation device, being located within, e.g. the arcuate slot with clearance to permit unimpeded movement of the pedal about its pivot, with the axis of the first pin being located closer to the driver/passenger compartment than the axis of the pedal pivot, with the second pin located closer to the engine compartment than the first pin, whilst the second component of the two component activation device comprises a cam member adapted, in use, to be secured to a portion of the vehicle designed to deform upon frontal impact, with a cam surface normally engaging the second pin, wherein, movement of the second component towards the first component eventually causes the first pin to strike the arcuate slot thereby rotating the upper pedal part towards the driver/passenger compartment, and the lower pedal part towards the engine compartment.

The means to bias the first component of the activation device to an inactive position is a spring, preferably a coil spring used in tension or in compression.

The arcuate slot is open ended adjacent the engine compartment.

The first component of the activation device incorporates a pivot pin, generally intermediate the first and second pins, about which pivot pin the first component may rotate, upon frontal impact, until such time as the clearance between the first pin and the arcuate slot is eliminated, and the first pin strikes the arcuate slot, to commence rotation of the lower pedal part away from the driver/passenger compartment and hence the driver.

In another embodiment, the activation device comprises a deformable inverted "V"-member, preferably of metal, with the member being straightened, or generally straightened, in a frontal impact situation with the relative lengthening of the member resulting in relative movement between said portion that is designed to deform and said portion designed for minimal deformation, and in pedal rotation to a safety position.

SUMMARY OF A SECOND ASPECT OF THE INVENTION

According to a second aspect of the invention, there is provided a motor vehicle comprising a pedal box in accordance with the first aspect, with the pedal box secured to a portion of the vehicle that is designed to deform or crumple and move towards the driver in the event of a frontal impact, with the second component of the activation device connected to a portion of the vehicle that is designed for minimal deformation upon frontal impact and to remain stable in the event of a frontal impact.

PREFERRED OR OPTIONAL FEATURES OF THE SECOND ASPECT

The pedal box comprises a pair of spaced-apart sidewalls.

A journal for opposite ends of the pedal pivot is provided in each sidewall on a common axis, the pedal pivot spanning the sidewalls and being pivotally located in the journals.

The minimal deformation portion is a cross-beam or cowl of the vehicle.

The designed to deform portion is the dash of the vehicle.

BRIEF DESCRIPTION OF THE DRAWINGS

Two embodiments of pedal box and vehicle in accordance with the first and second aspects of the invention are illustrated diagrammatically in FIGS. 1 and 2 of the accompanying drawings which are both side elevations of first and second embodiments of the pedal box in accordance with the first aspect, mounted in a vehicle in accordance with the second aspect.

DETAILED DESCRIPTION OF THE DRAWINGS

Figure 1:
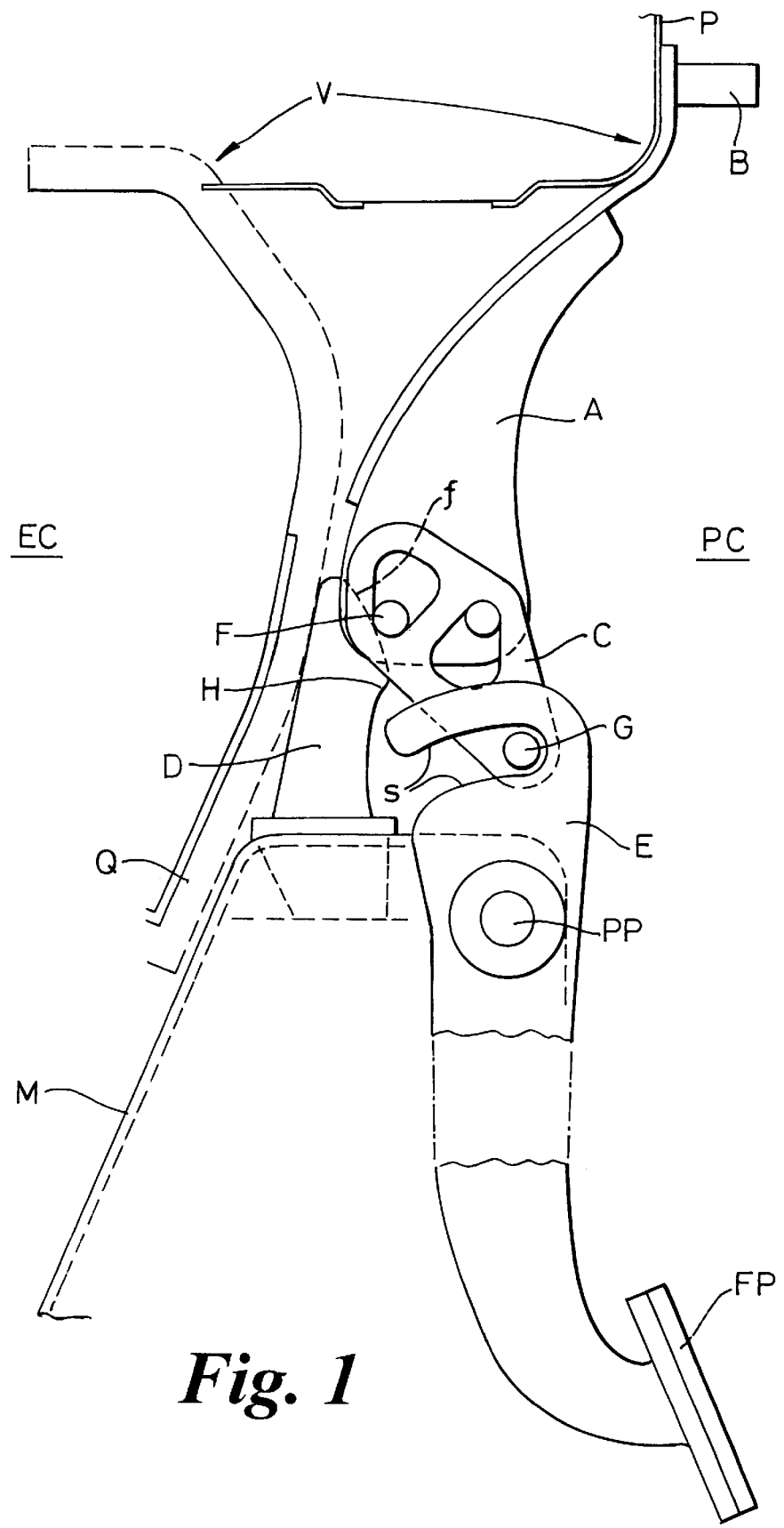

In FIG. 1 the various components are illustrated in "normal operation" positions. In a frontal crash situation, when cam (D) attached to a main bracket (M) in turn attached to a portion (Q) of the vehicle (V) designed, upon frontal impact, to deform, the main bracket (M) moves upwards and rearwards relative to top mount (B) secured to a portion (P) of the vehicle (V) designed for minimal deformation upon frontal impact, and pin (F) moves along the face (f) of cam (D) engaging pin (G) in slot (S) in pedal (E) under load from member (A). When pin (F) passes point (H) the load from the pedal (E) locks member (C) in place and holds the pedal (E) in retracted position.

Figure 2:
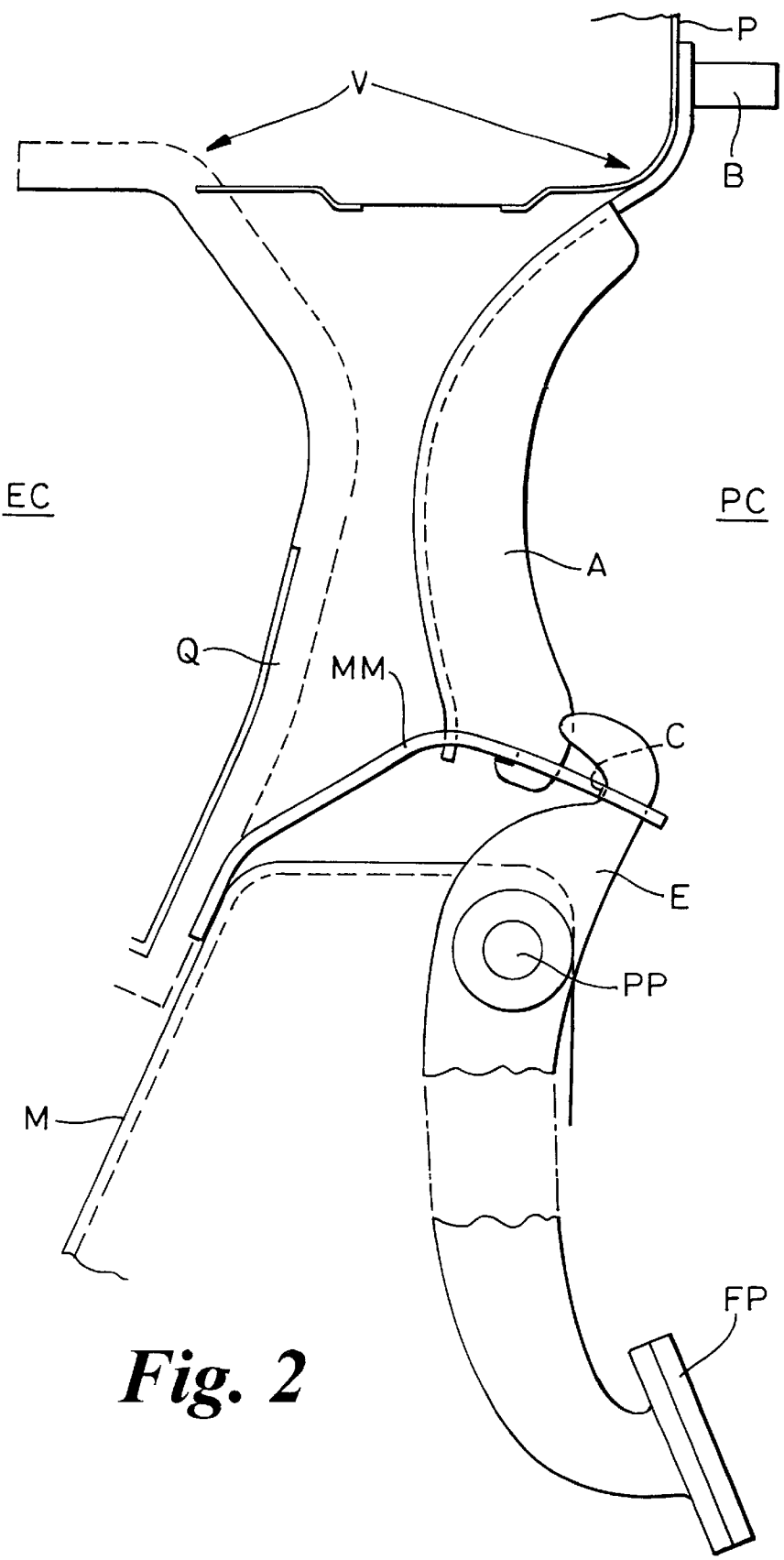

In the embodiment of FIG. 2, member (A), which is again attached to a portion (P) of the vehicle (V) intended for minimal deformation upon frontal impact, is moved, relatively down and to the left, an inverted metal "V"-member (MM) is straightened, forcing the pedal (E) to rotate clockwise and hence retract the pedal portion away from the driver/passenger compartment (PC), by contact at abutment surface (C). Once the metal member (MM) is deformed load on point (C) of pedal (E) is maintained.

What we claim is:

1. A safety pedal structure for a vehicle having a front engine compartment and a driver/passenger compartment, said structure comprising a pedal box having a front portion intended, when installed in a vehicle, to be remote from said driver/passenger compartment, and a rear portion intended to be adjacent said driver/passenger compartment, said pedal box incorporating at least one pedal pivotally mounted intermediate its ends on a pedal pin carried by said pedal box so as to have, beyond each side of said pedal pin, a lower pedal part carrying a footpad, and an upper pedal part, and further comprising an activation device comprising a cam and a link intermediate said cam and said upper pedal part, said link comprising first and second linearly spaced-apart pins, said first pin in an inactive position of said safety pedal structure, being located, with clearance in a slot in said upper pedal part to permit unimpeded movement of said pedal about its pivot pin, said second pin being located closer to said engine compartment than said first pin, whilst said cam is adapted, in use, to be secured to a portion of said vehicle designed to deform in a frontal impact of sufficient magnitude, with a surface of said cam normally engaging said second pin, wherein, when a frontal impact of sufficient magnitude occurs, movement of said cam towards said driver/passenger compartment as a result of deformation of said portion of said vehicle designed to deform effects some rotation of said link causing said first pin to strike an abutment surface provided by a bottom of said slot, to cause some rotation of said pedal to a safety position, with said lower portion of said pedal rotated towards said engine compartment.

2. A safety pedal structure as claimed in claim 1, wherein said first pin is located within said arcuate slot which is open ended adjacent said engine compartment.

3. A safety pedal structure as claimed in claim 1, wherein said link incorporates a pivot pin, generally intermediate said first and second pins, about which pivot pin said first component is rotatable, upon frontal impact, until such time as the clearance between said first pin and said arcuate slot is culminated, and first pin strikes a bottom of said arcuate slot, to commence rotation of said lower pedal part away from said driver/passenger compartment.

4. A motor vehicle having a front engine and a driver/passenger compartment, said vehicle comprising a safety pedal structure as defined in claim 1 secured to a portion of said vehicle that is designed to deform and move towards the driver in the event of a frontal impact, with the second component of the activation device connected to a portion of said vehicle that is designed for minimal deformation upon frontal impact and to remain stable in the event of a frontal impact.

5. A motor vehicle as claimed in claim 4, wherein said minimal deformation portion is a cross-beam or cowl of said vehicle.

6. A motor vehicle as claimed in claim 4, wherein said portion designed to deform is a dash of said vehicle.

7. A motor vehicle as claimed in claim 4, wherein said pedal box comprises a pair of spaced-apart sidewalls.

8. A motor vehicle as claimed in claim 9, wherein a journal for opposite ends of a pedal pivot is provided in each of said sidewalls on a common axis, said pedal pivot spanning said sidewalls and being pivotally located in said journals.

* * * * *